United States Patent [19]

Vandevoir et al.

[11] Patent Number: 4,596,170
[45] Date of Patent: Jun. 24, 1986

[54] BAR STOCK GUIDING DEVICE FOR USE WITH AUTOMATIC LATCHES

[75] Inventors: Claude A. Vandevoir, La Neuveville; Markus Geiser, Péry, both of Switzerland

[73] Assignee: Sameca S.A., Bienne, Switzerland

[21] Appl. No.: 674,714

[22] Filed: Nov. 26, 1984

Related U.S. Application Data

[63] Continuation of Ser. No. 280,215, Jul. 6, 1981, abandoned.

[30] Foreign Application Priority Data

Jul. 7, 1980 [CH] Switzerland .................. 5182/80

[51] Int. Cl.$^4$ .................. B23B 13/08; B23B 13/02
[52] U.S. Cl. .................. 82/38 A; 82/2.5; 414/17; 414/18
[58] Field of Search .................. 82/2.5, 2.7, 38 A; 414/14–18; 188/83, 70 R; 192/53 B; 408/241 B, 72 B

[56] References Cited

U.S. PATENT DOCUMENTS

| | | | |
|---|---|---|---|
| 1,656,450 | 1/1928 | Steur | 408/241 B |
| 3,228,271 | 1/1966 | Fluskey | 82/38 R |
| 3,525,277 | 8/1970 | Jeanpretre et al. | 82/2.5 |
| 3,557,971 | 1/1971 | Tomiyama | 82/2.5 |
| 3,651,906 | 3/1972 | Slator et al. | 188/83 |
| 3,828,630 | 8/1974 | Argereu | 82/38 A |
| 3,875,830 | 4/1975 | Lechot | 82/2.7 |
| 3,933,062 | 1/1976 | Huber | 82/38 A |
| 3,957,144 | 5/1976 | Opyrchal | 188/83 |
| 4,069,803 | 1/1978 | Cataldo | 192/53 B |
| 4,114,747 | 9/1978 | Eller | 188/83 |
| 4,129,220 | 12/1978 | Peterson et al. | 82/2.5 |
| 4,130,035 | 12/1978 | Langley | 82/38 A |

FOREIGN PATENT DOCUMENTS

| | | | |
|---|---|---|---|
| 0026042 | 4/1981 | European Pat. Off. | 82/38 A |
| 2930310 | 10/1980 | Fed. Rep. of Germany | 82/38 A |
| 1063266 | 3/1967 | United Kingdom | 82/38 A |
| 1212152 | 11/1970 | United Kingdom | 82/38 A |

*Primary Examiner*—Francis S. Husar
*Assistant Examiner*—Jerry Kearns
*Attorney, Agent, or Firm*—Parkhurst & Oliff

[57] ABSTRACT

A bar stock guiding device for use with automatic lathes comprises two cushions which have the shape of semicylindrical annuli. The cushions are applied against each other in a recess of a freely rotatable sleeve. This sleeve is located between the lathe and a tube of the guiding device which contains the bar of stock fed to the lathe. The sleeve normally rotates with the bar of stock, because the opening appearing between the cushions is adjusted with minimal small free play only to avoid whipping of the bar in the cushions and the propagation of vibrations to the stock bar part extending in the working area of the tools. When the pusher passes through the sleeve, it ejects the cushions out of the sleeve recess. Before this ejection occurs, a braking mechanism reduces the speed of rotation of the sleeve to a substantial extent.

3 Claims, 3 Drawing Figures

BAR STOCK GUIDING DEVICE FOR USE WITH AUTOMATIC LATCHES

This is a continuation of application Ser. No. 280,215 filed July 6, 1981 and now abandoned.

With an automatic lathe of determined capacity it is usual to machine not only stock bars having a diameter corresponding to the lathe capacity, but also smaller stock bars, down to a quarter of the lathe capacity. Thus a lathe having a capacity of 80 mm is commonly used to machine stock bars having a diameter ranging between 20 and 80 mm.

When the bar to be machined is smaller than the tube of the guiding device located behind the lathe, it is no longer sufficient to hold the stock bar at its two ends only i.e., the fore one by the gripping unit of the lathe, and the rear one, by the pusher. Under the effect of the centrifugal forces at great rotating speeds and due to the unavoidable balance errors, the bar vibrates excessively, if means are not provided for neutralizing the disturbing effects of such vibrations. The vibrations produce an awful row in the guiding tube, and are propagated beyond the collet chuck of the headstock spindle of the lathe in the bar part of the working area of the lathe tools. While an oil cushion formed between the bar fed to the lathe and the tube guiding that bar may neutralize the bar vibrations when the bar diameter is only a few millimeters smaller than that of the guiding tube, such a cushion is totally inoperative when the difference between the diameters of the bar and of the tube is greater.

Two solutions are known in the art to neutralize these vibrations. The first one consists in introducing in the guiding tube corresponding to the lathe capacity one or more reduction tubes set in one another; up to five for the smallest bars (Werkstatt und Betrieb, Volume 110, No. 12, December 1977, pages 903 and 904).

This solution has, however, several drawbacks. First of all, it is cumbersome. The reservation of substantially more free space in front of the guiding tube than that required solely for loading a new bar of stock, is required. While 3 m is sufficient free space to enable loading a new bar of stock, 1.5 m more must be reserved to set a reduction tube in place. This additional length is due to the pusher mounted in the reduction tube. This pusher must be long enough in order that its fore end can almost reach the gripping unit of the headstock spindle of the lathe while its rear end still lies in the guiding tube. Moreover, setting a reduction tube in is a delicate operation. In order to hold it coaxial with the tube in which it lies, it is surrounded by soft gaskets, of rubber or the like. Accordingly, care must be taken so that the gaskets are not torn, nor even displaced along the reduction tube, when setting the latter in place. Finally, the withdrawal of a reduction tube is messy work. While oil can be evacuated from the inside of the reduction tube by suction, the annular spaces between the reduction tubes remain full of oil, requiring that each be wiped up when withdrawn from the other. The oil filling the spaces between the tubes is lost.

The second solution consists of providing between the guiding tube and the lathe a bearing for the bar stock fed to the lathe. Some of these bearings, which are known in the art, comprise three rollers rotatably mounted, each one on a swingable lever. These bearings are, however, intricate, cumbersome and expensive, because they must have controlling means arranged to move the three rollers simultaneously to thereby hold the bar fed to the lathe coaxial with the lathe gripping unit.

Another type of bearing or steady rest known in the art comprises a pair of cushions adapted to the diameter of the bar fed to the lathe and encompassing the same. When the bar is driven in rotation during the machining operations, these cushions are either stationary or rotatable with the bar in tracks of fixed supporting means (U.S. Pat. No. 4,129,220; U.S. Pat. No. 3,074,566; U.S. Pat. No. 2,608,746; GB-A-1,212,152; GB-A-1,063,266; DE-A-2,930,310 and EP-B-0,026,042). These known bearings accordingly experience considerable wear and a heating between the cushions and the bar and between the formers and their supporting means.

The present invention relates to stock bar guiding devices for use with automatic lathes, and particularly to such devices which comprise a cylindrical tube arranged to be held coaxial with the lathe headstock spindle. A pusher in the tube is adapted to journal the rear end of the stock bar and to feed the same to the lathe up to its exhaustion. Semicylindrical cushions applied against each other and enclosing the stock bar fed to the lathe with only a small amount of free play, prevent the bar from whipping.

To avoid the above-mentioned drawbacks of the known devices of this type, the device according to the invention comprises a sleeve mounted in front of the guiding tube, freely rotatable around the tube axis. A cylindrical recess is provided in the front end of the sleeve. The cushions enclosing the bar are inserted in the recess so that these cushions and the sleeve can rotate together with the bar fed to the lathe.

It will be observed that it is more reliable, easier and simpler to prevent friction between a sleeve and its support than between either the bar and the ejectable cushions, or the latter and their support.

The device according to the invention is simple, reliable, and prevents the cushions from inopportunely running out of the sleeve recess, for instance upon feeding the bar to the lathe.

A braking effect resulting from the device according to another aspect of the invention prevents the cushions from being hurled, when they are pushed out of the sleeve recess.

One embodiment of the stock bar guiding device according to the invention is represented diagrammatically and by way of example in the accompanying drawings in which.

Figure 1:
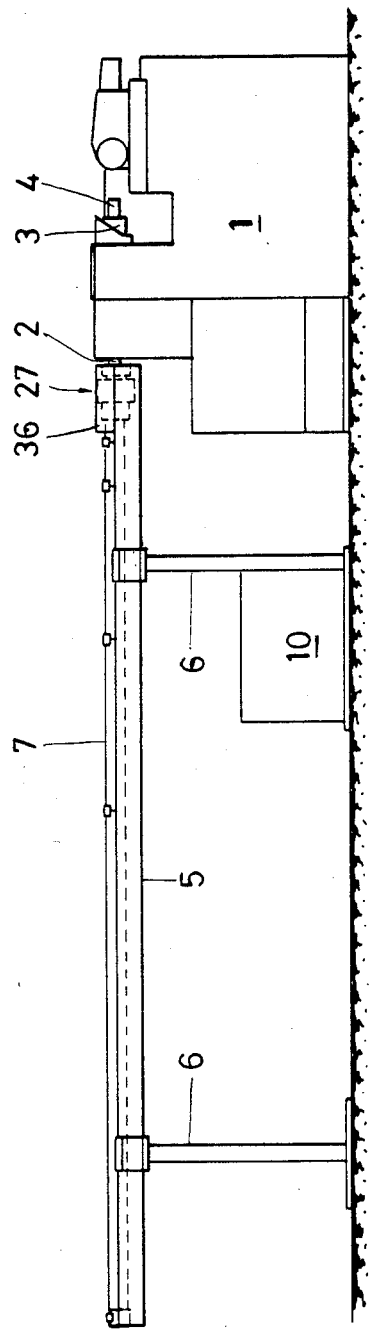
FIG. 1 is a general view thereof in elevation.

The guiding device shown in FIG. 1 ensures proper feeding an automatic lathe 1 by supporting a bar of stock 2 which it progressively pushes into the headstock spindle 3 of lathe 1, in order to machine a series of identical workpieces at the fore end 4 of bar 2 in the course of predetermined cycles of machining operations. This guiding device comprises a gutterlike support 5 held by uprights 6 in which is mounted a guiding tube 7 being coaxial with spindle 3.

Figure 2:
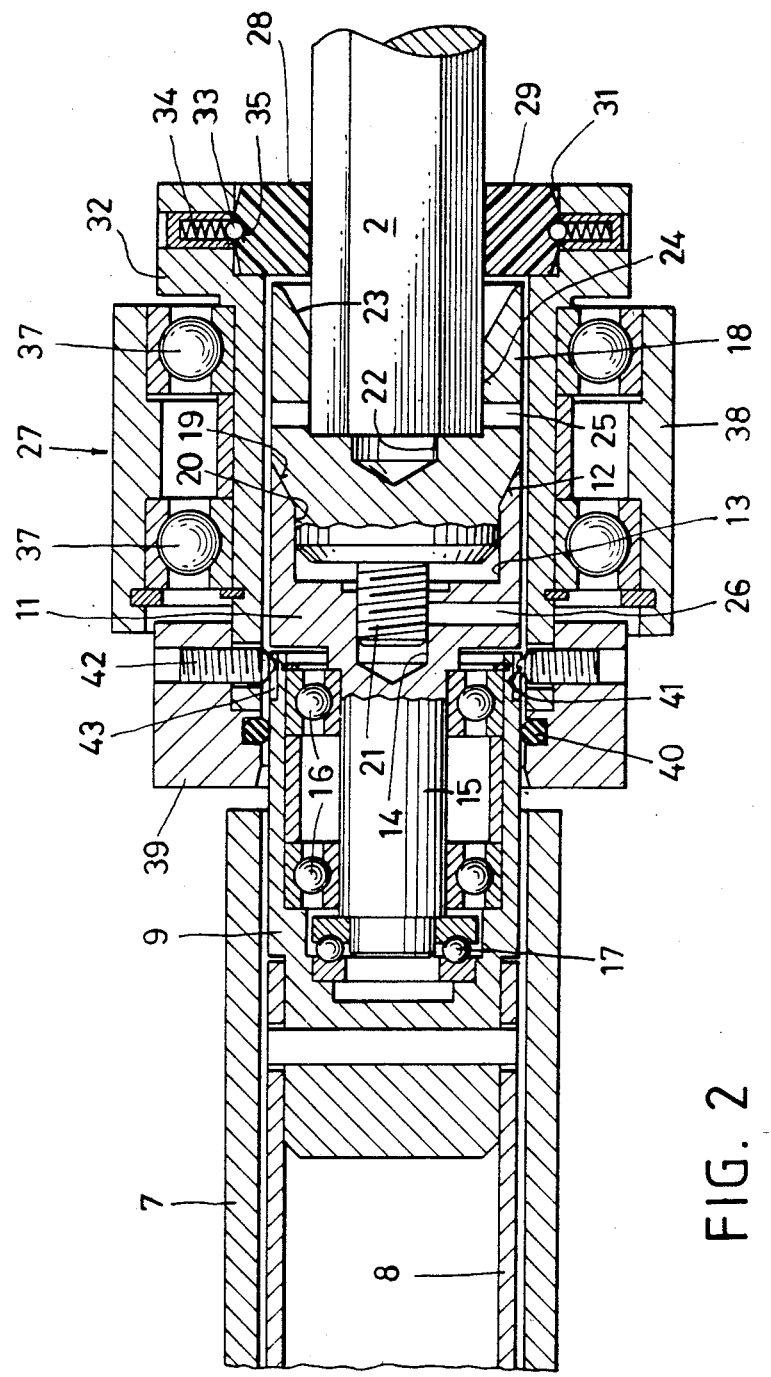
FIG. 2 is a sectional view on a larger scale of a part of FIG. 1.

To push bar 2 through spindle 3 (when a finished workpiece has been severed from the stock bar) for machining the next piece of the series, tube 6 encloses a pusher, the fore end of which only is visible in FIG. 2. This pusher is adapted to the bore of tube 7 in order to be freely slidable therein, but with the minimal free play. It comprises a body which does not rotate and which substantially consists of a cylindrical jacket 8, a plug 9 secured to the fore end of jacket 8 and a similar plug (not shown) secured to the rear end of jacket 8 and tightly closing the boring of tube 7 in order to constitute a hydraulic piston capable of reciprocating within tube 7. This pusher is, indeed, actuated in a manner well known to those skilled in the art, namely by means of oil lead under pressure to the rear end of tube 7 by a pipe (not shown) from a pump (not shown) located in the control box 10 (FIG. 1), also containing an oil tank (not shown). Said pump can also suck the oil contained in tube 7 behind the pusher and lead it back to the oil tank of box 10 while causing the pusher to move backwards along tube 7.

The pusher also comprises a head 11 provided with a truncated conical seat 12, a boring 13 and a tapped central hole 14. By means of a central shaft 15 journalled in two ball bearings 16 and pivoting on a thrust bearing 17, the bearings being located in recesses of plug 9, head 11 can freely rotate with respect to the pusher body 8, 9. An adapter 18, provided with a truncated conical surface 19 and a bearing surface 20 adjusted to seat 12 and boring 13, respectively, is secured to head 11 by means of a threaded central shank 21 screwed into hole 14. The adapter 18, thus forming part of the rotatable pusher head, is itself formed with a central bore 22 and a conical socket 23 in its front face. The user has to drill bore 24 in socket 23 to the diameter of the bars he will machine. Finally, adapter 18 is provided with a diametrical bore 25 and head 11 with a radial bore 26 to permit screwing adapter 18 into head 11 and, above all, unscrewing it.

The adapter 18, the head 11, the plug 19 and the jacket 8, constituting the pusher, have an equal diameter that corresponds to the capacity of the lathe 1. When the stock bars to be fed to the lathe have the same diameter as the pusher or a diameter only a little smaller than that of the pusher, the adapter can be dispensed with. The rear end of these stock bars must, however, be prepared by turning thereon a conical face having the same opening angle as seat 12. It is the head 11 itself that bears against the rear end of the stock bars.

With respect to the bars having a diameter approximately equal to the lathe capacity, it should be observed that already at the beginning of the machining operations, when the pusher 8, 9, 11 is at the rear end of tube 7, tube 7 alone neutralizes the bar vibrations, especially when the space between the bar and tube 7 is filled with oil.

Figure 3:
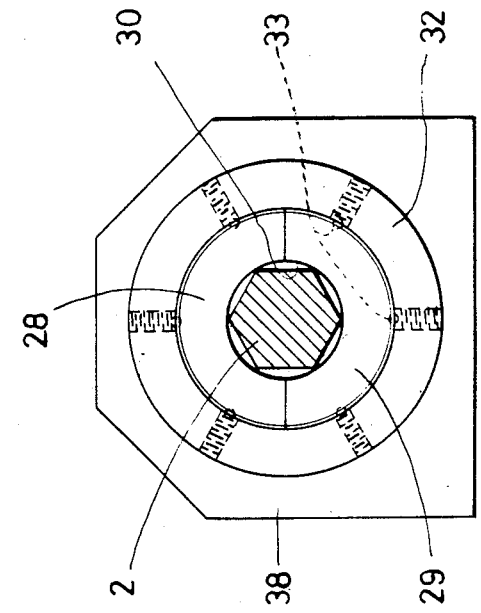
FIG. 3 is an end view of the part shown in FIG. 2.

To neutralize the vibrations of smaller bars, the guiding device according to the invention comprises means 27 located between tube 7 and lathe 1 (FIG. 1). These means are represented in detail in FIGS. 2 and 3. They essentially comprise a pair of cushions 28, 29 having the shape of semicylindrical annuli and being applied against each other (FIG. 3). These cushions are preferably made of plastic. Their manufacture is obviously very simple. The cylindrical opening 30 appearing between them is adjusted to the diameter of the bars to be fed to the lathe with very little free play, so that these bars may freely rotate in cushions 28, 29, but without vibrating therein. The cushions 28, 29 are still efficacious when the stock bars are not circular, but polygonal for instance, like bar 2 represented in FIGS. 2 and 3.

The cushions 28, 29 are inserted in a cylindrical recess 31 of a sleeve 32, the boring of which has the same diameter as tube 7. Balls 33, urged by springs 34, normally hold cushions 28, 29 in recess 31 by engaging an annular groove 35 provided in the outer side surface of the cushions. Upon moving through sleeve 32, the adapter 18 pushes, however, the cushions 28, 29 out of recess 31, while causing the balls 33 to be retracted. These cushions 28, 29 are thus ejected into a casing constituted in part by the gutterlike support 5 and in part by a cover member 36 (FIG. 1) where they can be recovered for reinserting into recess 31 when a new bar of stock is inserted into tube 7. After having ejected cushions 28, 29, the pusher can further move forward and enter the headstock spindle 3 of the lathe until it comes in the vicinity of its gripping unit which is usually a collet chuck, the stock bar then being exhausted.

As regards sleeve 32, it is idly mounted by means of ball bearings 37 in a frame 38 fixed to the gutter-like support 5. During the whole machining of bar 2, the sleeve 32 is driven in rotation within frame 38 at a speed being only slightly slower than that of bar 2, due to the frictional engagement of the latter with the cushions 28, 29. To avoid ejecting in casing 5, 36 cushions rotating at such a speed, a mechanism exerting a progressive braking action on sleeve 32 is mounted in a ring 39 set on sleeve 32. Ring 39 also prevents the piston formed at the rear end of the pusher from sliding out of tube 7. The braking mechanism comprises an annular rubbery gasket 40 and spring-pressed balls 41 confined to caps 42 screwed into ring 39. Gasket 40 and caps 42 are located at a distance from cushions 28, 29 which is greater than the length of the rotary pusher part 11, 18. This pusher part thus moves beyond the braking mechanism before reaching the cushions 28, 29. Plug 9, which is part of the non-rotating pusher body, consequently enters gasket 40 before cushions 28, 29 are ejected from recess 31. Thus, a first braking action on sleeve 32 results from the engagement of plug 9 with gasket 40. Still before the ejection of cushions 28, 29, the fore part of plug 9 comes opposite the balls 41. By jumping over the corrugation 43 formed in the fore part of plug 9, the balls 41 substantially increase the braking effect produced by gasket 40.

If the braking mechanism disclosed does not bring sleeve 32 to a standstill at the moment of the ejection of cushions 28, 29, it nevertheless reduces its speed of rotation to such an extent that the centrifugal forces then exerted on cushions 28, 29 can be neglected.

We claim:

1. A bar stock guiding device for use with automatic lathes comprising:
   a cylindrical tube having a longitudinal axis;
   a lathe headstock spindle coaxial with said cylindrical tube;
   a pusher located on an inside of said cylindrical tube and means for longitudinally moving said pusher in said cylindrical tube, said pusher journalling a rear end of a bar stock and feeding said bar stock to a lathe until said bar stock is depleted;
   a sleeve, said sleeve being freely rotatable on a bearing about said longitudinal axis of said tube and being located forward of said tube;
   a cylindrical recess provided in a front end face of said sleeve;
   a plurality of semicylindrical cushions inserted in said cylindrical recess and enclosing said bar stock with limited free play between said semicylindrical cushions and said bar stock such that the bar stock is prevented from whipping;
   a braking mechanism for braking said sleeve, whereby said braking mechanism acts on said sleeve just prior to said pusher contacting said semicylindrical cushions and ejecting said semicylindrical cushions from said cylindrical recess.

2. A bar stock guiding device according to claim 1, wherein said braking mechanism exerts a progressive braking action on said sleeve.

3. A bar stock guiding device according to claim 2, wherein said pusher comprises a cylindrical body having a corrugation formed around its forward end and a rotary head part, said rotary head part having diameter substantially equal to a diameter of said body and said rotary head being located forward of said body; said braking mechanism being mounted on said sleeve at an axial distance from said cushions exceeding the length of said rotary head part, and comprising a soft ring and a spring loaded ball; whereby said pusher first enters said soft ring and then said corrugation reaches and interacts with said ball just prior to said pusher contacting and ejecting said cushions.

* * * * *